United States Patent
Xu et al.

(10) Patent No.: US 12,473,718 B1
(45) Date of Patent: Nov. 18, 2025

(54) INTELLIGENT RAINWATER REGULATION AND STORAGE SYSTEM BASED ON MID-LAYER WATER INTAKE

(71) Applicant: CCCC SECOND HIGHWAY CONSULTANTS CO., LTD., Wuhan (CN)

(72) Inventors: Tianhui Xu, Wuhan (CN); Chujiang Chen, Wuhan (CN); Haiyan Zhou, Wuhan (CN); Yanbin Ruan, Wuhan (CN); Xing Liu, Wuhan (CN)

(73) Assignee: CCCC SECOND HIGHWAY CONSULTANTS CO., LTD., Wuhan (CN)

( * ) Notice: Subject to any disclaimer, the term of this patent is extended or adjusted under 35 U.S.C. 154(b) by 0 days.

(21) Appl. No.: 19/283,285

(22) Filed: Jul. 29, 2025

Related U.S. Application Data

(63) Continuation of application No. PCT/CN2025/094391, filed on May 12, 2025.

Foreign Application Priority Data

May 13, 2024 (CN) .......................... 202410584644.3

(51) Int. Cl.
*E03B 1/02* (2006.01)
*E03B 1/04* (2006.01)

(52) U.S. Cl.
CPC ..................................... *E03B 1/02* (2013.01)

(58) Field of Classification Search
CPC .................................... E03B 1/02; E03B 1/04
See application file for complete search history.

(56) References Cited

U.S. PATENT DOCUMENTS

| | | | |
|---|---|---|---|
| 6,941,702 B1 * | 9/2005 | Abrams | E03B 1/041 137/376 |
| 2020/0024834 A1 * | 1/2020 | Park | E03B 5/04 |

* cited by examiner

*Primary Examiner* — Paul J Gray

(57) ABSTRACT

An intelligent rainwater regulation and storage system based on mid-layer water intake is provided. The system includes a vertical rod and a limiting sleeve fixedly disposed at a bottom of a rainwater regulation and storage pool, a sliding sleeve and a limiting rod are disposed on an upper part and a lower part of the vertical rod; a box body is slidably connected to a side of the sliding sleeve; and a floating block is disposed on a top of the box body. The box body with a hollow structure includes a main impeller chamber, a regulating chamber, an auxiliary impeller chamber, and a gear chamber. A motor is disposed outside a side plate of the main impeller chamber, a driving shaft of the motor extends into the main impeller chamber, and the driving shaft is connected to a spiral conveying pipe through a gear assembly.

9 Claims, 8 Drawing Sheets

INTELLIGENT RAINWATER REGULATION AND STORAGE SYSTEM BASED ON MID-LAYER WATER INTAKE

CROSS-REFERENCE TO RELATED APPLICATIONS

This application is a continuation of International Patent Application No. PCT/CN2025/094391, filed on May 12, 2025. The International Patent Application claims priority to a Chinese patent application No. CN202410584644.3 filed on May 13, 2024. The entire contents of the above-mentioned applications are hereby incorporated by reference.

TECHNICAL FIELD

The disclosure relates to the technical field of sponge city construction, and more particularly to an intelligent rainwater regulation and storage system based on mid-layer water intake.

BACKGROUND

With a development of sponge cities, popularity of a rainwater garden, a bioretention tank, a grassed swale, and a rainwater regulation and storage pool in a newly built community has significantly increased. As a key component of sponge city construction, the rainwater regulation and storage pool integrates water storage, drainage, and ecological functions, and is an essential part of the sponge city construction.

In a process of sponge city construction, the rainwater regulation and storage pool is an essential facility for enabling a residential community or a district to meet requirements of a peak runoff reduction index, a non-point source pollution reduction index, and a rainwater resource utilization index. To fully realize economic benefits of the facility, regulated and stored rainwater in the facility is often comprehensively utilized after rainfall.

During rainfall, rainwater entering the rainwater regulation and storage pool is typically only screened through a grille to remove large floating debris. After rain, some impurities with a density lower than water in the rainwater stored in the rainwater regulation and storage pool will float on a surface of water inside the rainwater regulation and storage pool, while some particles with a density higher than the water will deposit at a bottom of the rainwater regulation and storage pool. If the rainwater is directly pumped from the rainwater regulation and storage pool for utilization, it is inevitable that floating debris on the surface of the water or sediment at the bottom of the rainwater regulation and storage pool will be taken, which will compromise long-term operation of a rainwater comprehensive utilization system in the rainwater regulation and storage pool after rain.

A Chinese patent with a publication No. CN109778996A discloses a rainwater treatment system for a rainwater regulation and storage tank, relating to the technical field of rainwater and including the rainwater regulation and storage tank for regulating and storing rainwater. A water suction well is disposed beside the rainwater regulation and storage tank, and a mid-layer water taking assembly is disposed in the rainwater regulation and storage tank. A water taking port communicating with the water suction well is defined on a tank wall of the rainwater regulation and storage tank. The mid-layer water taking assembly includes a skimming port, a skimming port water outlet pipe communicating with the skimming port, a connecting straight pipe and a mid-layer water outlet pipe. The connecting straight pipe communicates with the skimming port water outlet pipe and the mid-layer water outlet pipe.

The mid-layer water outlet pipe is mounted at the water taking port; the skimming port is suspended in a middle of rainwater in the rainwater regulation and storage tank, and an opening of the skimming port is disposed facing downward. According to the rainwater treatment system for the rainwater regulation and storage tank, the opening of the skimming port of the mid-layer water taking assembly is disposed downward, and the skimming port is suspended, so that mid-layer water with better water quality in the rainwater regulation and storage tank can be taken out, the floating debris on a water surface of the rainwater regulation and storage tank can be prevented from being taken out from the water taking port, and the sediment deposited on the rainwater regulation and storage tank can also be prevented from being taken out from the water taking port.

In related art, a suspended pipeline water intake is disposed in a mid-layer water area of the rainwater regulation and storage tank, and the water is taken out through driving a motor. When a water level of the rainwater regulation and storage tank drops and the suspended pipeline water intake port is lower than a lower limit position of water intake, the motor continues to drive without intervening in a water intake operation, resulting in intaking unexpected rainwater. In a process of water intake, a water intake device has no self-check reset function. When cleaning the floating debris or impurities in the rainwater regulation and storage tank, it is necessary to fish manually or wait for natural sinking, which is inefficient.

SUMMARY

To solve deficiencies in related art, the disclosure aims to provide an intelligent rainwater regulation and storage system based on mid-layer water intake. When a water inlet of a device is lower than a lower limit water level, a clean water pipe is closed by a toggle assembly to ensure quality of water intake. By setting closing and resetting functions of the clean water pipe, the quality of water intake is further ensured. By setting a pipeline cleaning component to clean impurities or floating debris in a rainwater regulation and storage pool, the quality of water intake can be purified.

To realize aforementioned objectives, the disclosure uses the following technical solutions.

The intelligent rainwater regulation and storage system based on mid-layer water intake includes a vertical rod and a limiting sleeve fixedly disposed on a bottom of the rainwater regulation and storage pool. A sliding sleeve is disposed on an upper part of the vertical rod, and a limiting rod is disposed on a lower part of the vertical rod. A box body is slidably connected to a side of the sliding sleeve. A floating block is disposed on a top of the box body. The box body is in a hollow structure. A transverse partition plate is disposed inside the box body and configured to divide the box body into two compartments. A first longitudinal partition plate is disposed inside one of the two compartments, and the one of the two compartments is divided into a main impeller chamber and a regulating chamber through the first longitudinal partition plate. A second longitudinal partition plate is disposed inside the other of the two compartments, and the other of the two compartments is divided into an auxiliary impeller chamber and a gear chamber through the second longitudinal partition plate. The first longitudinal partition plate and the second longitudinal partition plate are perpendicular to the transverse partition plate. A motor is disposed on an outer side of a side plate of the main impeller chamber facing away from the transverse partition plate. A driving shaft of the motor extends into the main impeller chamber, and a main impeller is disposed on the driving shaft. The regulating chamber and the auxiliary impeller chamber are disposed on two sides of a centerline of the main impeller, respectively. A first diversion port is defined on the transverse partition plate between the main impeller chamber and the auxiliary impeller chamber. A second diversion port is defined on the first longitudinal partition plate. A box body water inlet is defined on a side plate of the auxiliary impeller chamber facing away from the transverse partition plate. The driving shaft penetrates through the transverse partition plate and extends into the gear chamber. A driving gear is disposed on a part of the driving shaft inside the gear chamber. An output end of the driving shaft, after meshed with a gear assembly, is connected to a spiral shaft. The spiral shaft extends outside the box body. A spiral blade is disposed on the spiral shaft. A spiral conveying pipe is sleeved outside the spiral blade. The box body water inlet is disposed inside the spiral conveying pipe. A conveying pipe inlet is defined on a side of the spiral conveying pipe facing toward the box body. A clean water pipe is thoroughly disposed on an upper part of a side plate of the regulating chamber and extends into the regulating chamber, and a sewage pipe is thoroughly disposed on a lower part of the side plate of the regulating chamber and extends into the regulating chamber. A first vertical opening of the clean water pipe inside the regulating chamber and a second vertical opening of the sewage pipe inside the regulating chamber are disposed opposite to each other. A plug guide rod is disposed between the first vertical opening and the second vertical opening. A first plug and a second plug are disposed on two ends of the plug guide rod, respectively. The plug guide rod slidably penetrates through a first limiting block and a second limiting block. An end of the first limiting block and an end of the second limiting block are fixedly disposed on another side plate of the regulating chamber. A toggle assembly is disposed on a side of the plug guide rod.

In an embodiment, the toggle assembly includes a guide handle base. The guide handle base is disposed between the plug guide rod and the transverse partition plate and fixedly disposed on the first longitudinal partition plate. A guide handle is disposed on the guide handle base through a guide handle rotating shaft. An end of the guide handle facing away from the guide handle rotating shaft is connected to an end of a spring through a second spring pin. Another end of the spring is connected to a middle part of the plug guide rod through a first spring pin. A guide sleeve is disposed on a side of the guide handle base facing away from the plug guide rod. A toggle guide rod slidably penetrates the guide sleeve. A bottom of the toggle guide rod is slidably disposed in the limiting sleeve. A first horizontal bar and a second horizontal bar are disposed on the toggle guide rod facing toward the limiting rod. The first horizontal bar is disposed above the limiting rod, and the second horizontal bar is disposed below the limiting rod. A first traction plate and a second traction plate are disposed on the toggle guide rod facing toward the guide handle. The first traction plate is disposed above the guide handle, and the second traction plate is disposed below the guide handle.

In an embodiment, the gear assembly includes the driving gear, a driven gear, a first transmission gear, and a second transmission gear. The driving gear is meshed with the driven gear, and the driven gear is disposed on an end of a driven shaft. The driven shaft is disposed on opposite side plates of the gear chamber through bearings. The first transmission gear is disposed on another end of the driven shaft and meshed with the second transmission gear. The second transmission gear is connected to the spiral shaft.

In an embodiment, an auxiliary impeller is disposed inside the auxiliary impeller chamber, and an axis of the auxiliary impeller is perpendicular to an axis of the main impeller. An impeller shaft of the auxiliary impeller extends vertically downward through a bottom plate of the box body. A power gear is disposed on an end of the impeller shaft and meshed with an intermediate gear. The intermediate gear is meshed with a reduction gear. The intermediate gear is disposed on an outer side of the bottom plate through a first rotating shaft. The reduction gear is disposed on the outer side of the bottom plate through a second rotating shaft.

In an embodiment, a suspension rod is fixedly disposed on a bottom of the reduction gear. A wedge body is threadedly connected to a side of the suspension rod facing away from a center of the reduction gear. A third horizontal bar is disposed on a side of the toggle guide rod facing toward the center of the reduction gear. The third horizontal bar is disposed above a bottom plane of the wedge body.

In an embodiment, the sliding sleeve is connected to the box body through a sliding block. A side of the sliding sleeve is thoroughly defined with a sliding slot along a vertical direction. The sliding block is disposed in the sliding slot, and an end of the sliding block facing away from the sliding slot is welded to the box body.

In an embodiment, an end of the spiral conveying pipe facing away from the box body is connected to an end of a corrugated pipe, and another end of the corrugated pipe is connected to an end of a drainage pipe. The drainage pipe is disposed outside the rainwater regulation and storage pool. Another end of the drainage pipe facing away from the rainwater regulation and storage pool is lower than a height of the spiral conveying pipe and connected to a pressure regulating pipe. A tank is disposed on the pressure regulating pipe, and the pressure regulating pipe is communicated to a tank water inlet. A one-way valve is disposed at the tank water inlet. A tank water outlet on the tank is communicated to a return pipe. A diameter of the return pipe is smaller than that of the drainage pipe. An end of the return pipe facing away from the tank extends onto a filter screen inside the rainwater regulation and storage pool. A drain valve is disposed at an end of the pressure regulating pipe facing away from the drainage pipe.

In an embodiment, a detachable filter screen is disposed on the pressure regulating pipe. The detachable filter screen is disposed at a front end of the drain valve.

In an embodiment, the drain valve is a counterweight drain valve.

In an embodiment, a slidable sleeve is disposed on a free end of the third horizontal bar.

Compared with the related art, the disclosure has the following beneficial effects.

1. When the box body water inlet for intaking water in a mid-layer water area approaches the lower limit water level, the toggle assembly is triggered. The guide handle pushes back a top of the second traction plate, causing a free end of the guide handle to rotate around the guide handle rotating shaft to a position above the guide handle base. The spring then drives the first plug on the plug guide rod to seal a clean water elbow, switching the box body water inlet to communicate to a sewage elbow, thereby preventing non-compliant rainwater from being conveyed to a usage area. At this time, the box body water inlet is communicated to the sewage pipe, effluent from the sewage pipe is discharged into the rainwater regulation and storage pool, and the spiral conveying pipe continuously runs to convey, reflux and filter water in the rainwater regulation and storage pool, and then flows water after filtered into the rainwater regulation and storage pool. When a water level of the rainwater regulation and storage pool rises, the toggle assembly is triggered again. The guide handle pushes back a bottom of the first traction plate, the free end of the guide handle rotates around the guide handle rotating shaft to a position below the guide handle base. The spring drives the second plug on the plug guide rod to seal the sewage elbow, so that the box body water inlet is switched to communicate to the clean water elbow, and the rainwater meeting a standard is transported to outside world.

In a process of water intake, the device automatically adjusts the toggle assembly to realize timely switching between the clean water pipe and the sewage pipe, so as to ensure the quality of water intake. The process of water intake does not need manual monitoring and turning off the motor to adjust a direction of a conveying pipeline, which saves manpower, improves efficiency and avoids errors caused by manual operation. When the water level of the rainwater regulation and storage pool drops and a water quality does not meet the standard, the device automatically switches the box body water inlet to communicate to the sewage pipe. At this time, the device stops conveying rainwater to the clean water pipe, but the spiral conveying pipe continues to operate to filter the water in the rainwater regulation and storage pool and purify the water quality.

2. When the box body water inlet is below the lower limit water level, and the clean water pipe of the box body is in an opening state, the wedge body moves circularly with the reduction gear. The third horizontal bar moves from bottom to top with an inclined plane of the wedge body. The third horizontal bar drives the second traction plate on the toggle guide rod to press the guide handle upward, and the free end of the guide handle rotates around the guide handle rotating shaft. The guide handle drives the first plug on the plug guide rod through the spring to seal the clean water elbow. When the box body water inlet is above the lower limit water level and the clean water pipe of the box body is in the opening state, the second horizontal bar shafts upward with the box body, and a top of the second horizontal bar is close to a bottom of the limiting rod. The wedge body moves circularly with the reduction gear, and the third horizontal bar moves from bottom to top with the inclined plane of the wedge body. The wedge body drives the third horizontal bar, driving the second horizontal bar at a lower part of the toggle guide rod to move upward. The top of the second horizontal bar is abutted against the bottom of the limiting rod, causing the box body to move downward. The free end of the guide handle is abutted and presses against the second traction plate, and the free end of the guide handle rotates upward around the guide handle rotating shaft under a reaction force, driving the first plug on the plug guide rod to seal the clean water elbow. At this time, due to a circular motion of the wedge body, the third horizontal bar gradually moves away from a top or the inclined plane of the wedge body, and the box body moves upward. The free end of the guide handle located above the guide handle base is abutted against the first traction plate. Under the reaction force, the free end of the guide handle rotates downward around the guide handle rotating shaft, driving the second plug on the plug guide rod to move downward and seal the sewage elbow, restoring the clean water elbow to the opening state.

During the process of water intake, the wedge body that performs the circular motion on the device periodically pushes the free end of the guide handle above the guide handle base. The first plug on the plug guide rod is driven by the spring to seal and close the clean water elbow, preventing sewage from being transported to the usage area when device components lose control. At the same time, the toggle assembly reopens the clean water elbow that meets conditions for water intake in the mid-layer water area but is forcibly closed. By setting a self-checking and resetting device, the clean water elbow can be closed in a timely manner when a water intake position does not meet a water intake area, preventing the sewage from entering the clean water pipe and further ensuring the quality of water intake.

3. The pressure regulating pipe, the drain valve, and the tank are disposed at a lower position outside the rainwater regulation and storage pool. Mixed water containing impurities collected from the spiral conveying pipe enters the tank at the lower position through the pressure regulating pipe. Under a pressure of the tank, the water is transported from the tank water outlet to the filter screen inside the rainwater regulation and storage pool through the return pipe.

DESCRIPTION OF REFERENCE NUMERALS

Figure 1:
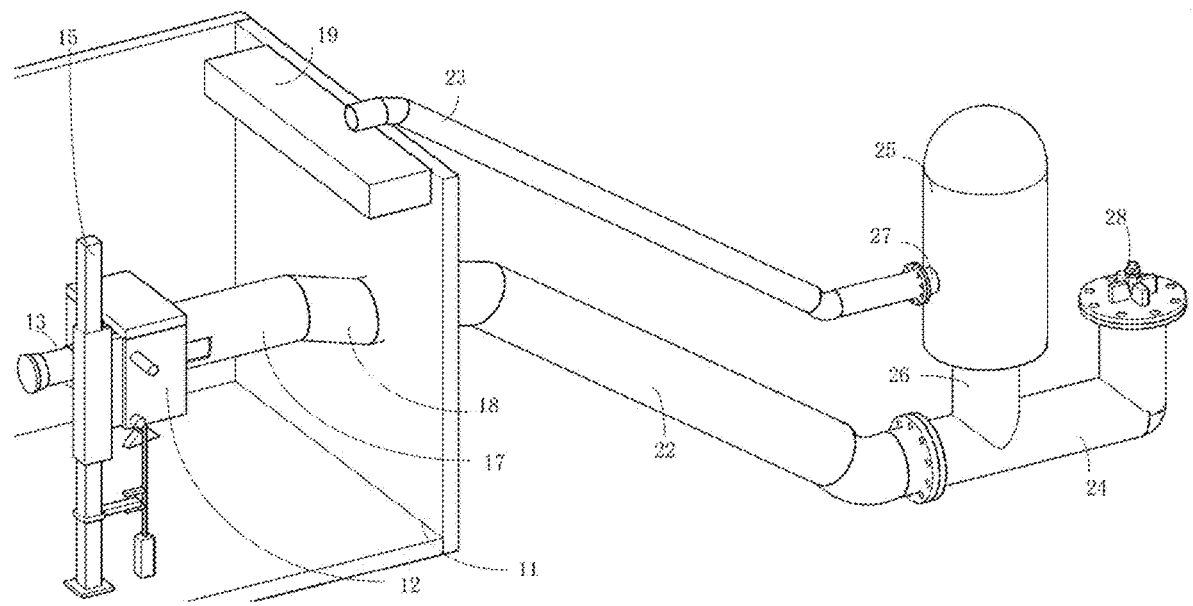
FIG. 1 illustrates a schematic perspective installation structural view of an intelligent rainwater regulation and storage system based on mid-layer water intake according to an embodiment of the disclosure.

11: rainwater regulation and storage pool; 12: box body; 13: motor; 14: floating block; 15: vertical rod; 16: sliding sleeve; 17: spiral conveying pipe; 18: corrugated pipe; 19: filter screen; 20: clean water pipe; 21: sewage pipe; 22: drainage pipe; 23: return pipe; 24: pressure regulating tube; 25: tank; 26: tank water inlet; 27: tank water outlet; 28: drain valve; 29: sliding block; 30: sliding slot; 31: conveying pipe inlet; 32: limiting rod; 33: limiting sleeve; 34: toggle guide rod; 35: first horizontal bar; 36: second horizontal bar; 37: third horizontal bar; 38: wedge body; 39: box body water inlet; 40: spiral shaft; 41: spiral blade; 42: bracket; 43: main impeller chamber; 44: auxiliary impeller chamber; 45: gear chamber; 46: regulating room; 47: first horizontal plate; 48: second horizontal plate; 49: transverse partition plate; 50: first longitudinal plate; 51: second longitudinal plate; 52: first longitudinal partition plate; 53: second longitudinal partition plate; 54: impeller shaft; 55: main impeller; 56: auxiliary impeller; 57: bottom plate; 58: top plate; 59: first diversion port; 60: second diversion port; 61: driving shaft; 62: driven shaft; 63: driving gear; 64: driven gear; 65: first transmission gear; 66: second transmission gear; 67: first limiting block; 68: second limiting block; 69: plug guide rod; 70: first plug; 71: second plug; 72: clean water elbow; 73: sewage elbow; 74: guide sleeve; 75: first traction plate; 76: second traction plate; 77: guide handle rotating shaft; 78: spring; 79: guide handle; 80: guide handle base; 81: first spring pin; 82: second spring pin; 83: power gear; 84: intermediate gear; 85: reduction gear; 86: suspension rod; 87: overflow port; 88: one-way valve; 89: first vertical opening; 90: second vertical opening; 91: first rotating shaft; 92: second rotating shaft; 93: detachable filter screen.

DETAILED DESCRIPTION OF EMBODIMENTS

Technical solutions in embodiments of the disclosure will be clearly and completely described as follows with reference to the embodiments of the disclosure. Apparently, embodiments described are merely part of the embodiments of the disclosure, not all of them.

Content not described in detail in the specification belongs to the technologies known to those skilled in the art. In description of the disclosure, it should be understood that, orientational or positional relationships indicated by terms "center", "up", "down", "front", "back", "left", "right", "longitudinal", "transverse", "top", "bottom", "inside", "outside", "clockwise", and "counterclockwise" are orientational or positional relationships illustrated in attached drawings. These terms are only for convenience of describing the disclosure and simplifying the description and do not indicate or imply that referred devices or elements must have specific orientations, or be constructed and operated in specific orientations, so they cannot be understood as limiting the disclosure. In addition, terms "first", "second", "third", etc. are only used to distinguish descriptions and cannot be understood as indicating or implying relative importance.

The disclosure provides an intelligent rainwater regulation and storage system based on mid-layer water intake. As illustrated in FIG. 1, a vertical rod 15 is fixedly disposed on a bottom of a rainwater regulation and storage pool 11. A widened and enlarged base plate is disposed at a contact position between the vertical rod 15 and the rainwater regulation and storage pool 11 to enhance stability. A sliding sleeve 16 is disposed on an upper part of the vertical rod 15, and a limiting rod 32 is disposed on a lower part of the vertical rod 15. The sliding sleeve 16 is sleeved on the vertical rod 15 and fixed to the vertical rod 15 by bolts. A disposition position of the sliding sleeve 16 can be adjusted according to a vertical movement range of a box body 12. A position of the limiting rod 32 on the vertical rod 15 is adjusted based on a preset lower limit height of the box body 12.

Figure 2:
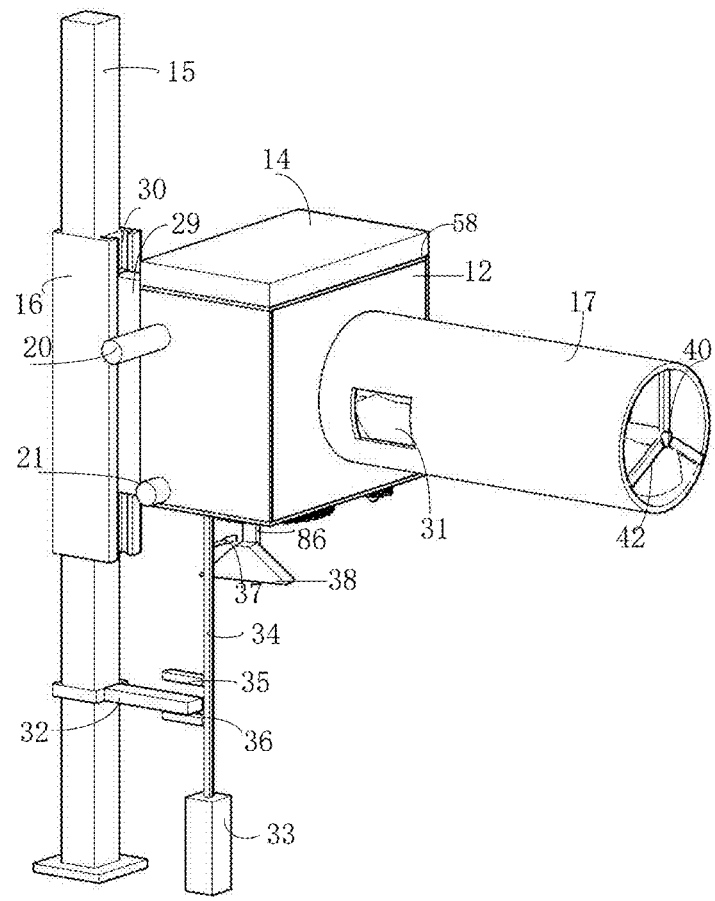
FIG. 2 illustrates a schematic structural view of a box body coordinating with a vertical rod according to the embodiment of the disclosure.
Figure 3:
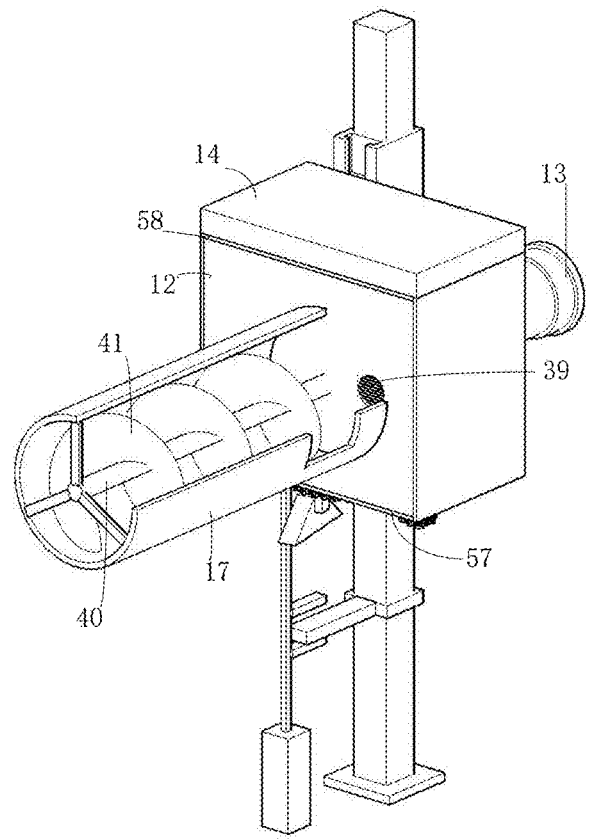
FIG. 3 illustrates a schematic sectional perspective structural view of a spiral conveying pipe according to the embodiment of the disclosure.

As illustrated in FIG. 1 through FIG. 3, a floating block 14 is disposed on a top plate 58 of the box body 12. A height of the box body 12 staying in water can be adjusted by increasing or decreasing a number of the floating block 14. In this embodiment, a box body water inlet 39 is below a water surface of the rainwater regulation and storage pool 11 and is not less than 400 millimeters (mm) away from the water surface, as well as no less than 400 mm away from the bottom of the rainwater regulation and storage pool 11. A sliding slot 30 with a T-shape is vertically and thoroughly defined on a side of the sliding sleeve 16, and a sliding block 29 with a T-shape is welded to the box body 12. The sliding block 29 is slidably engaged with the sliding slot 30, to thereby allow the box body 12 to move up and down along the vertical rod 15 with changes in buoyancy.

Figure 4:
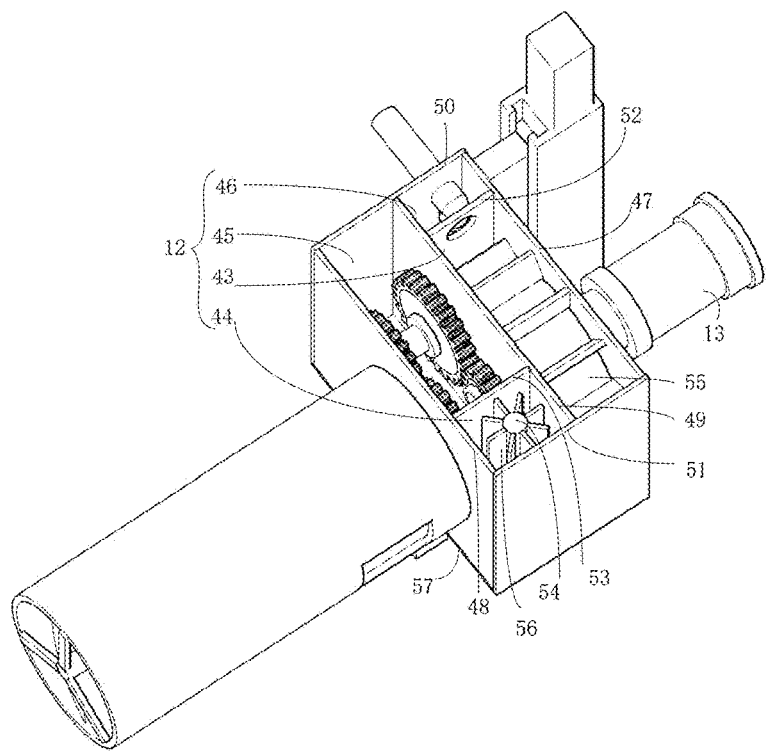
FIG. 4 illustrates a first schematic sectional perspective structural view of the box body according to the embodiment of the disclosure.

As illustrated in FIG. 4, the box body 12 is in a hollow structure. The box body 12 includes a main impeller chamber 43, an auxiliary impeller chamber 44, a gear chamber 45, and a regulating chamber 46. A transverse partition plate 49 is disposed inside the box body 12. A first longitudinal plate 50 and a second longitudinal plate 51 are both perpendicularly connected to the transverse partition plate 49. The transverse partition plate 49 divides the box body into two compartments. The first longitudinal partition plate 52 is disposed inside one of the two compartments. The one of the two compartments is divided into the main impeller chamber 43 and the regulating chamber 46 through the first longitudinal partition plate 52. The first longitudinal partition plate 52 is perpendicular to a first horizontal plate 47 and the transverse partition plate 49. The second longitudinal partition plate 53 is disposed inside the other of the two compartments. The other of the two compartments is divided into the auxiliary impeller chamber 44 and the gear chamber 45. The second longitudinal partition plate 53 is perpendicular to a second horizontal plate 48 and the transverse partition plate 49. The first longitudinal partition plate 52 and the second longitudinal partition plate 53 are disposed perpendicular to the transverse partition plate 49. The regulating chamber 46 and the auxiliary impeller chamber 44 are disposed on two sides of a centerline of a main impeller 55, respectively.

A motor 13 is disposed on an outer side of a side plate of the main impeller chamber 43 facing away from the transverse partition plate 49. The motor 13 is an underwater motor, sealed and waterproof, commercially available, and is a technology in the art.

Figure 5:
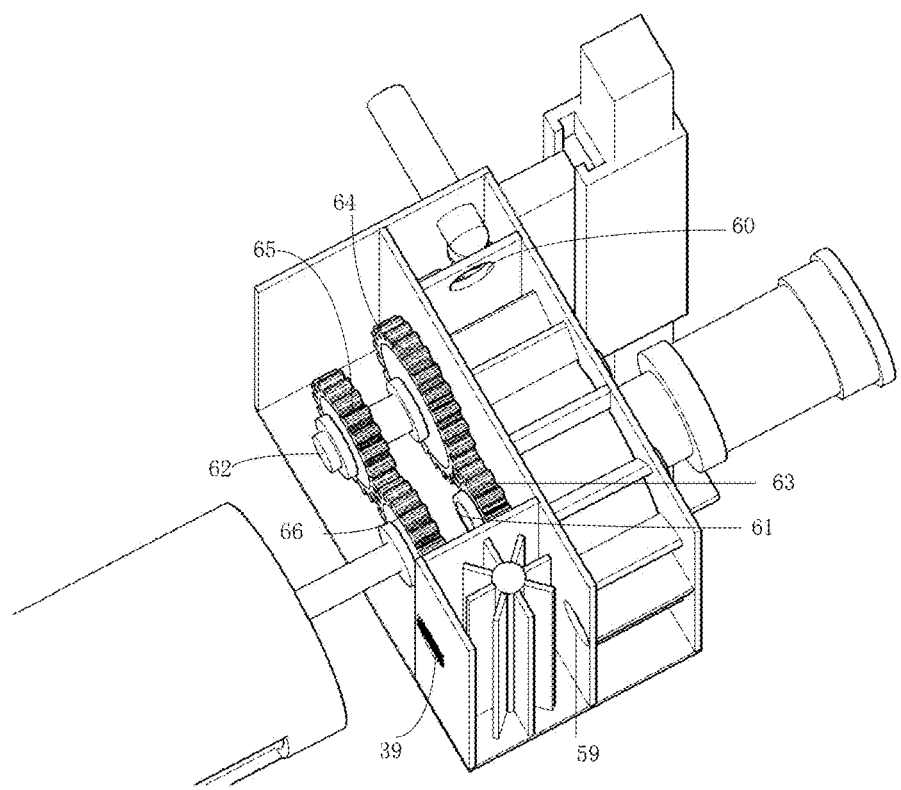
FIG. 5 illustrates a second schematic sectional perspective structural view of the box body according to the embodiment of the disclosure.

As illustrated in FIG. 5, a driving shaft 61 is disposed on the motor 13. The driving shaft 61 penetrates through the first horizontal plate 47 and extends into the main impeller chamber 43. The driving shaft 61 is connected to the first horizontal plate 47 by a sealed bearing. The main impeller 55 is disposed on a part of the driving shaft 61 inside the main impeller chamber 43.

Figure 6:
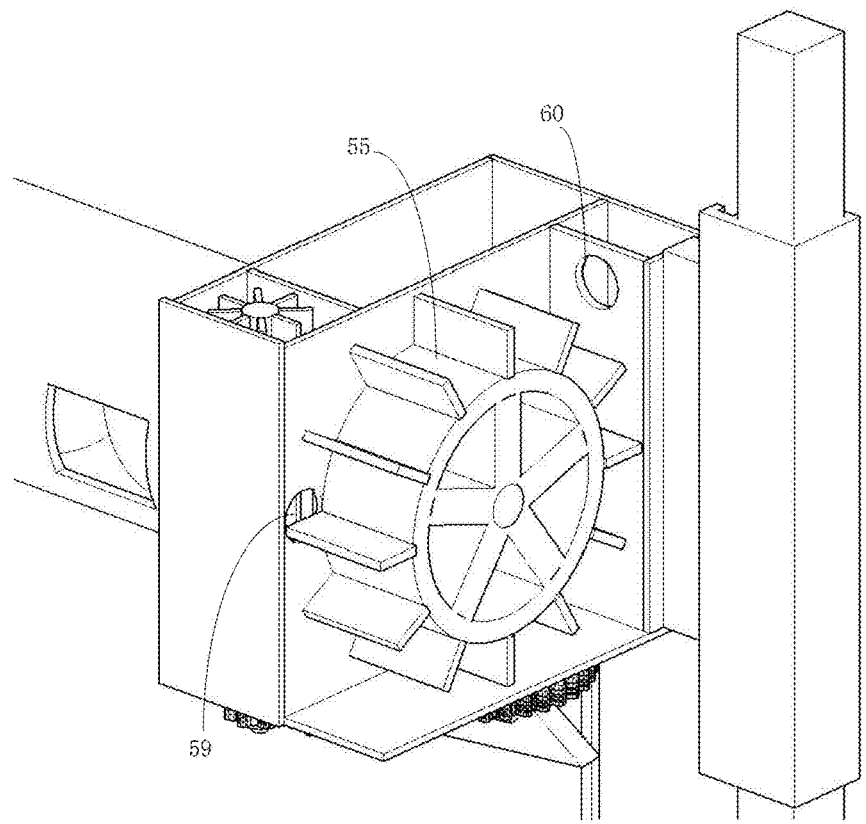
FIG. 6 illustrates a schematic sectional perspective structural view of a main impeller chamber according to the embodiment of the disclosure.

As illustrated in FIG. 5 and FIG. 6, a first diversion port 59 is defined on the transverse partition plate 49 between the main impeller chamber 43 and the auxiliary impeller chamber 44. A second diversion port 60 is defined on the first longitudinal partition plate 52. The box body water inlet 39 is defined on a side plate of the auxiliary impeller chamber 44 facing away from the transverse partition plate 49. A filter mesh is disposed on the box body water inlet 39. When the motor 13 drives the main impeller 55 to rotate, water flows into the regulating chamber 46 through the box body water inlet 39, the auxiliary impeller chamber 44, the first diversion port 59, the main impeller chamber 43 and the second diversion port 60 in turn.

The driving shaft 61 extends through the transverse partition plate 49 and extends into the gear chamber 45. A driving gear 63 is disposed on a part of the driving shaft 61 inside the gear chamber 45. An output end of the driving shaft 61, after meshed with a gear assembly, is connected to a spiral shaft 40.

As illustrated in FIG. 4 and FIG. 5, the gear assembly includes the driving gear 63, a driven gear 64, a first transmission gear 65, and a second transmission gear 66. The driving gear 63 is meshed with the driven gear 64. The driven gear 64 is disposed on an end of a driven shaft 62. The driven shaft 62 is disposed on opposite side plates of the gear chamber 45 (i.e., the transverse partition plate 49 and the second horizontal plate 48) through bearings. The first transmission gear 65 is disposed on another end of the driven shaft 62 and meshed with the second transmission gear 66. The second transmission gear 66 is connected to the spiral shaft 40. In the embodiment, a number of teeth of the driven gear 64 is greater than that of the driving gear 63, thereby achieving initial deceleration. A number of teeth of the second transmission gear 66 is greater than that of the first transmission gear 65, thereby achieving further deceleration. An output speed of the motor 13 is transmitted to the spiral shaft 40 after being continuously decelerated by the gear assembly.

As illustrated in FIG. 2 and FIG. 3, the spiral shaft 40 extends to an outer side of the box body 12. A spiral blade 41 is disposed on the spiral shaft 40. A spiral conveying pipe 17 is sleeved outside the spiral blade 41. A bracket 42 is disposed inside an end of the spiral conveying pipe 17 facing away from the box body 12. The spiral shaft 40 is disposed at a center of the bracket 42 through bearings.

The box body water inlet 39 is disposed inside the spiral conveying pipe 17. A conveying pipe inlet 31 is defined on a side of the spiral conveying pipe 17 facing toward the box body 12. The filter mesh is disposed on the box body water inlet 39, when the water enters the box body water inlet 39, the impurities in the water are collected in the spiral conveying pipe 17.

Figure 7:
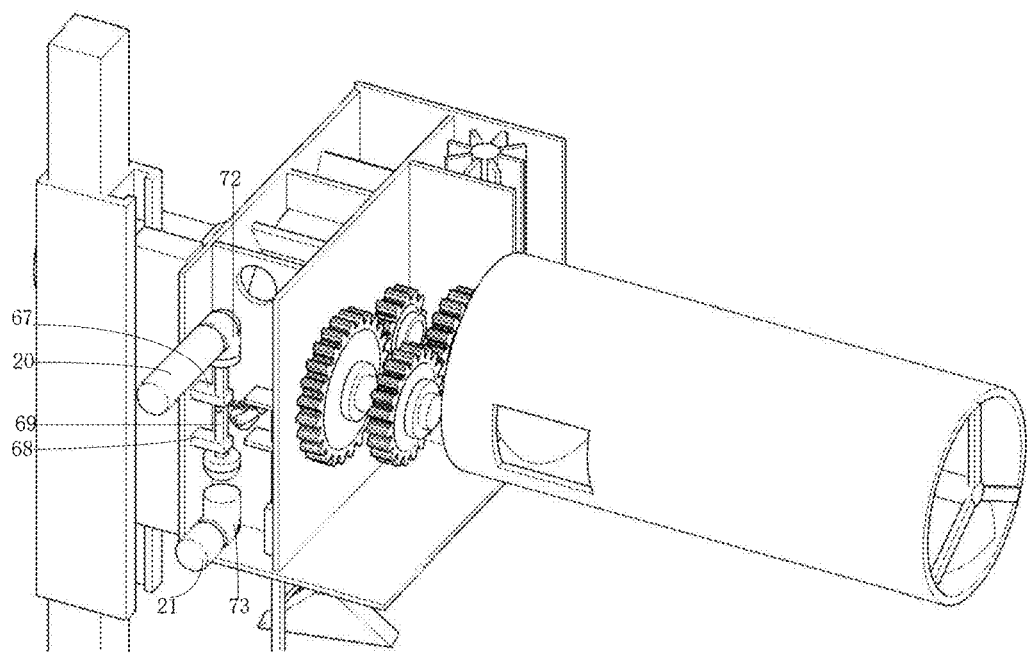
FIG. 7 illustrates a schematic sectional perspective structural view of a gear chamber according to the embodiment of the disclosure.
Figure 8:
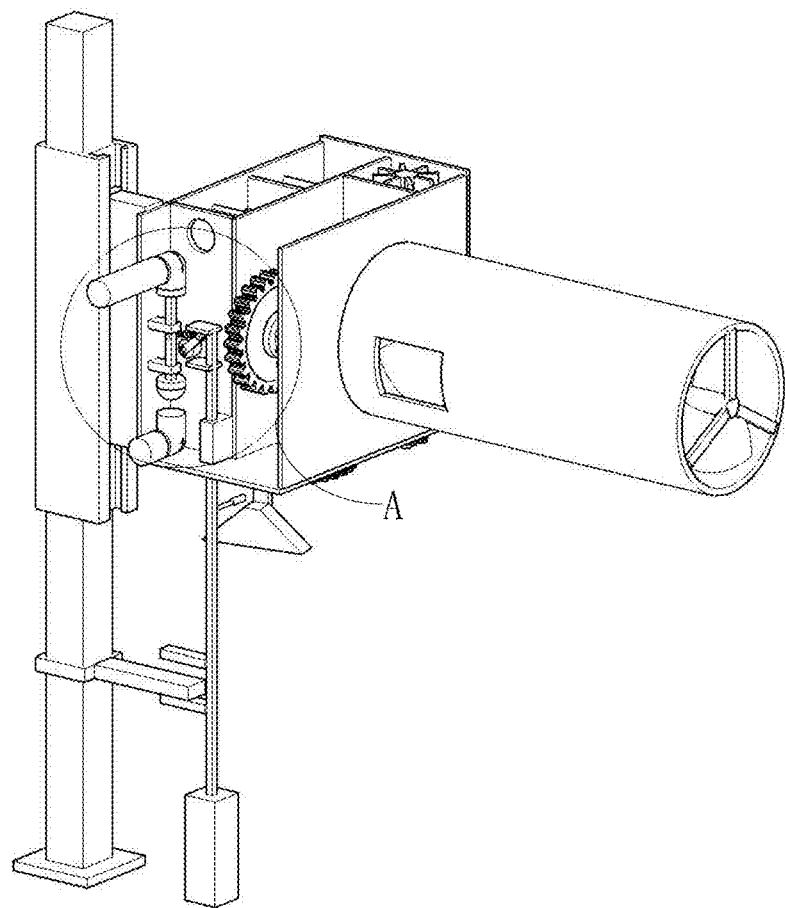
FIG. 8 illustrates a schematic sectional perspective structural view of a regulating chamber according to the embodiment of the disclosure.
Figure 9:
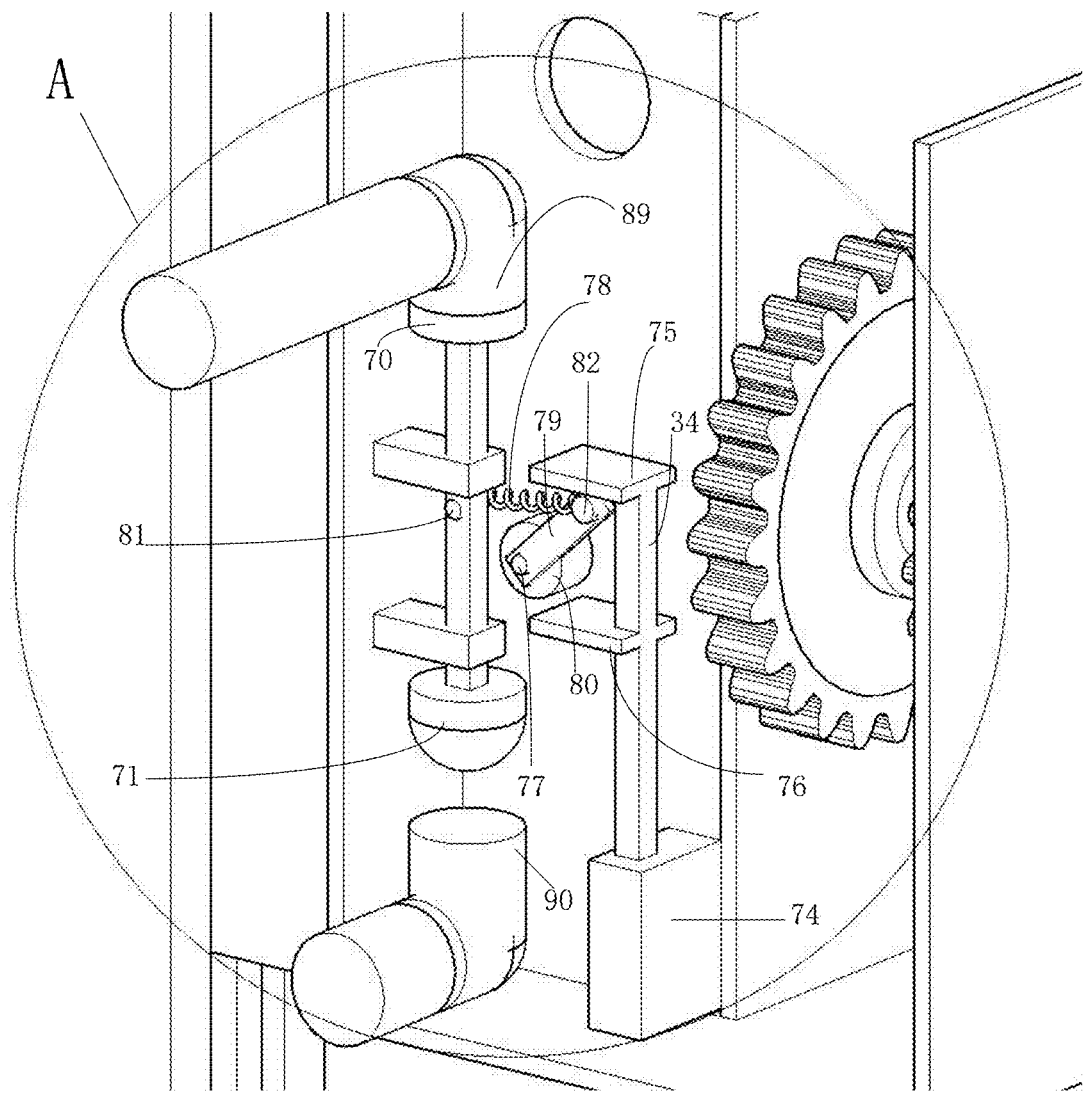
FIG. 9 illustrates an enlarged schematic structural view of A of the regulating chamber according to the embodiment of the disclosure illustrated in FIG. 8.

As illustrated in FIG. 7 through FIG. 9, a clean water pipe 20 is thoroughly disposed on an upper part of a side plate of the regulating chamber 46 and extends into the regulating chamber 46. A sewage pipe 21 is thoroughly disposed on a lower part of the side plate of the regulating chamber 46 and extends into the regulating chamber 46. The clean water pipe 20 is connected to a clean water elbow 72, and the sewage pipe 21 is connected to a sewage elbow 73. Openings of the clean water elbow 72 and the sewage elbow 73 in the regulating chamber 46 (i.e., a first vertical opening 89 of the clean water pipe 20 inside the regulating chamber 46 and a second vertical opening 90 of the sewage pipe 21 inside the regulating chamber 46) are vertically disposed opposite to each other. A plug guide rod 69 is disposed between the openings of the clean water elbow 72 and the sewage elbow 73. A first plug 70 and a second plug 71 are symmetrically disposed on two ends of the plug guide rod 69, respectively. The plug guide rod 69 slidably penetrates through a first limiting block 67 and a second limiting block 68. An end of the first limiting block 67 and an end of the second limiting block 68 are fixedly disposed on another side plate of the regulating chamber 46.

As illustrated in FIG. 7 and FIG. 9, a toggle assembly is disposed on a side of the plug guide rod 69 to control the first plug 70 to seal the clean water elbow 72 or the second plug 71 to seal the sewage elbow 73. When the first plug 70 is separated from the clean water pipe 20, the second plug 71 is sealed with the sewage pipe 21; that is, the box body water inlet 39 is communicated to the clean water pipe 20. Effluent from the clean water pipe 20 is transported to a rainwater comprehensive usage area connected to an outer side of the rainwater regulation and storage pool 11. When the second plug 71 is separated from the sewage pipe 21 and the first plug 70 is sealed with the clean water pipe 20, the box body water inlet 39 is communicated to the sewage pipe 21. Effluent from the sewage pipe 21 is discharged into the rainwater regulation and storage pool 11. At this time, the spiral conveying pipe 17 continuously runs to convey, reflux and filter the water in the rainwater regulation and storage pool 11, purifying water quality.

As illustrated in FIG. 9, the toggle assembly includes a guide handle base 80. The guide handle base 80 is disposed between the plug guide rod 69 and the transverse partition plate 49 and fixedly disposed on the first longitudinal partition plate 52 by bolts. A guide handle 79 is disposed on the guide handle base 80 through a guide handle rotating shaft 77. An end of the guide handle 79 facing away from the guide handle rotating shaft 77 is connected to an end of a spring 78 through a second spring pin 82. Another end of the spring 78 is connected to a middle part of the plug guide rod 69 through a first spring pin 81. When the end of the guide handle 79 connected to the spring 78 is subjected to an upward or downward external force, the guide handle 79 moves in a direction of the external force. When the guide handle 79 rotates around the guide handle rotating shaft 77 to a position perpendicular to the plug guide rod 69, no external force is required. Under an inertia of the guide handle 79 and a restoring force of the spring 78, the guide handle 79 will quickly continue to rotate in an original direction of motion.

A guide sleeve 74 is disposed on a side of the guide handle base 80 facing away from the plug guide rod 69. A toggle guide rod 34 slidably penetrates the guide sleeve 74; and a bottom of the toggle guide rod 34 is slidably disposed in a limiting sleeve 33. The limiting sleeve 33 is fixedly disposed at the bottom of rainwater regulation and storage pool 11 or fixedly connected to the vertical rod 15.

A first horizontal bar 35 and a second horizontal bar 36 are disposed on the toggle guide rod 34 facing toward the limiting rod 32. The first horizontal bar 35 is disposed above the limiting rod 32, and the second horizontal bar 36 is disposed below the limiting rod 32. The first horizontal bar 35, the second horizontal bar 36, and the limiting rod 32 all have overlapping portions in their projections in a vertical direction. A first traction plate 75 and a second traction plate 76 are disposed on the toggle guide rod 34 facing toward the guide handle 79. The first traction plate 75 is disposed above the guide handle 79, and the second traction plate 76 is disposed below the guide handle 79. The first traction plate 75, the second traction plate 76, and the guide handle 79 all have overlapping portions in their projections in the vertical direction.

When the first plug 70 is sealed with the clean water elbow 72, a free end of the guide handle 79 (i.e., the end of the guide handle 79 connected to the spring 78) is located above the guide handle base 80 (i.e., an upper stationary position). When the second plug 71 is sealed with the sewage elbow 73, the free end of the guide handle 79 is located below the guide handle base 80 (i.e., a lower stationary position). When the guide handle 79 is in above-mentioned two states, a distance between the upper and lower stationary positions of the free end of the guide handle 79 is defined as A, and a distance between the first traction plate 75 and the second traction plate 76 is defined as B. A and B satisfy A=2B (ignoring thicknesses of components). The guide handle 79 is located between the first traction plate 75 and the second traction plate 76. The first traction plate 75, the second traction plate 76, and the guide handle 79 all have overlapping portions in their projections in the vertical direction.

During use, a buoyancy acting on the box body 12 can be changed by adjusting a volume of floating block 14, to thereby adjust a depth of the box body 12 staying in the rainwater regulation and storage pool 11. In the embodiment, a depth of the box body water inlet 39 below the water surface is not less than 400 mm away from the water surface. The sliding block 29 is slidably engaged with the sliding slot 30, to thereby allow the box body 12 to move up and down along the vertical rod 15 with the changes in buoyancy.

To determine the position of the limiting rod 32 on the vertical rod 15, the first horizontal bar 35 is firstly fixed on the toggle guide rod 34. Based on a lower limit depth of water intake, a height position of the limiting rod 32 on the vertical rod 15 is adjusted, and a position of the box body 12 is adjusted by sliding the box body 12 up and down. In the embodiment, a distance between the box body water inlet 39 and the bottom of the rainwater regulation and storage pool 11 is adjusted to 400 mm. Secondly, the second plug 71 is sealed with the sewage elbow 73. The free end of the guide handle 79 is located below the guide handle base 80. The second traction plate 76 is abutted against the free end of the guide handle 79. Then the limiting rod 32 is moved until a top of the limiting rod 32 is abutted against a bottom of the first horizontal bar 35. At this time, the height position of the limiting rod 32 on the vertical rod 15 is a lower limit position. The limiting rod 32 is fixed on the vertical rod 15. The second horizontal bar 36 is fixed on a position where the first horizontal bar 35 extends downwards from a position of the first horizontal bar 35, and an extension distance is defined as C, and C and A satisfy A=2C (ignoring the thickness of the components).

As illustrated in FIG. 7 through FIG. 9, when the motor 13 is working normally and the box body 12 is taking water from the mid-layer water area, the free end of the guide handle 79 is located below the guide handle base 80, the second plug 71 is sealed with the sewage elbow 73, and the first plug 70 is separated from the clean water elbow 72. The water flows out through the clean water elbow 72 and is conveyed to the rainwater comprehensive usage area. When a water level drops, the box body 12 falls to a preset lower limit water level (the distance between the box body water inlet 39 and the bottom of the rainwater regulation and storage pool 11 is 400 mm). At this time, the toggle assembly is triggered, a top of the second traction plate 76 is abutted against a bottom of the guide handle 79, and the top of the limiting rod 32 is abutted against the bottom of the first horizontal bar 35. As the water level continues to drop, the box body 12 moves downward along the water level, causing the guide handle 79 to be pushed in a reverse direction, and the free end of the guide handle 79 moves upward. When the free end of the guide handle 79 moves to the position perpendicular to the plug guide rod 69, due to the restoring force of the spring 78, the free end of the guide handle 79 is quickly pulled by the spring 78 to the position above the guide handle base 80. Under the reaction force of the spring 78, the plug guide rod 69 drives the first plug 70 to seal the clean water elbow 72 and the second plug 71 to separate from the sewage elbow 73, thereby opening the sewage elbow 73. In this way, the water flows through the sewage pipe 21 into the rainwater regulation and storage pool 11. At this time, the box body water inlet 39 is communicated to the sewage pipe 21, and the effluent from the sewage pipe 21 is discharged into the rainwater regulation and storage pool 11. The spiral conveying pipe 17 continuously runs to convey, reflux and filter the water in the rainwater regulation and storage pool 11, and discharge the water after filtered into the rainwater regulation and storage pool 11.

When the water level rises, the box body 12 moves upward along the water level. At this time, a bottom of the first traction plate 75 is abutted against a top of the free end of the guide handle 79, and a top of the second horizontal bar 36 is abutted against the bottom of the limiting rod 32. When the box body 12 continues to move upward, the free end of the guide handle 79 moves downward. The guide handle 79 is quickly pulled by the spring 78 to the position below the guide handle base 80. Under the reaction force of the spring 78, the plug guide rod 69 is pulled downward. The plug guide rod 69 drives the second plug 71 to seal the sewage elbow 73 and the first plug 70 to separate from the clean water elbow 72, thereby opening the clean water elbow 72, so that rainwater meeting a standard can be transported to a usage area through the clean water elbow 72.

Figure 10:
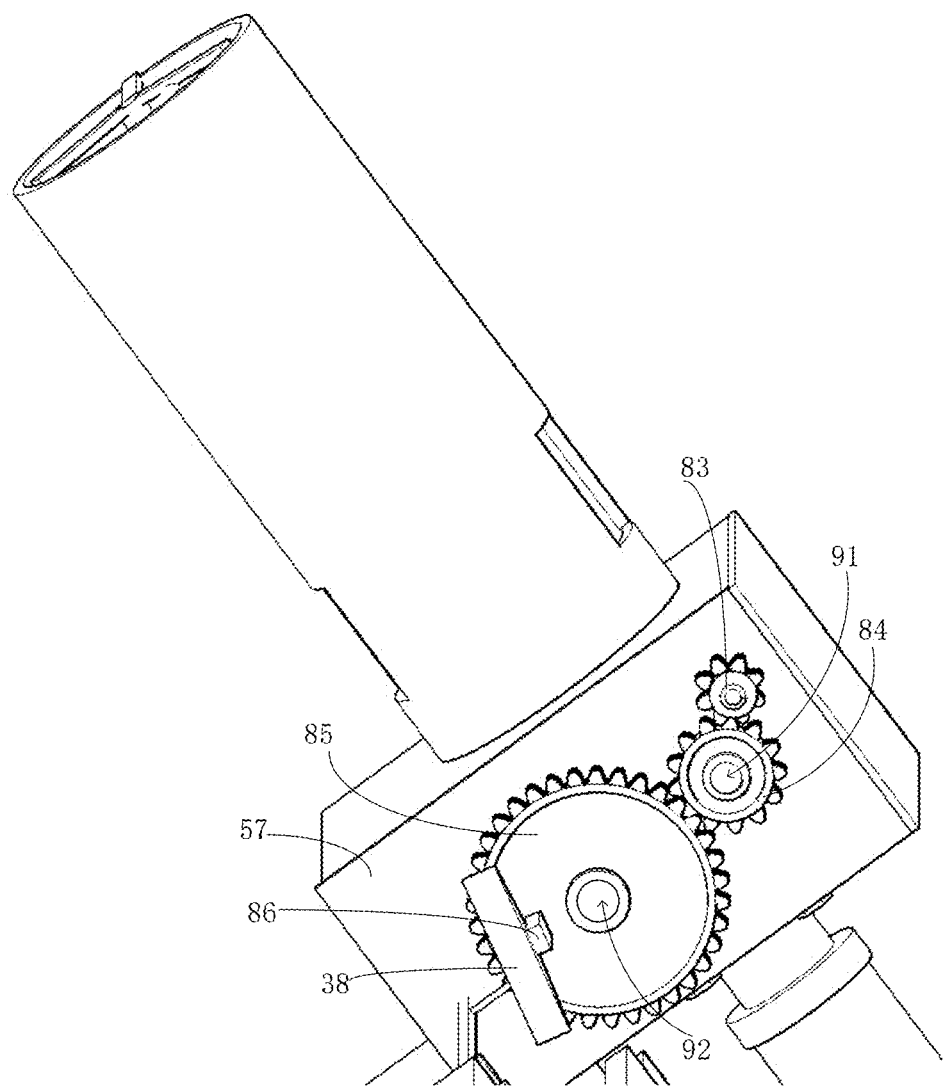
FIG. 10 illustrates a schematic structural view of a bottom of the box body according to the embodiment of the disclosure.
Figure 11:
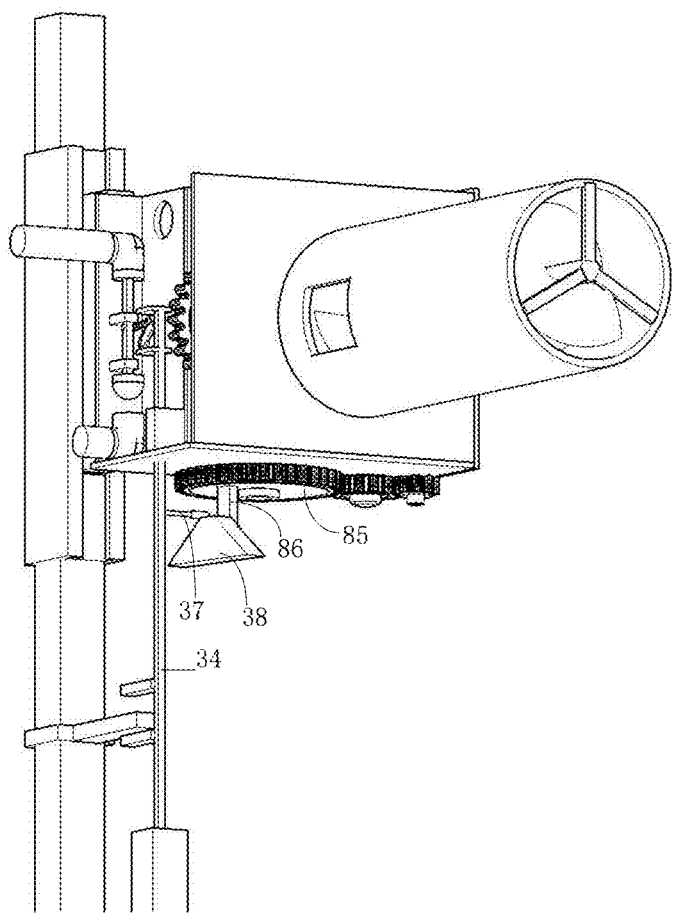
FIG. 11 illustrates a schematic structural view of a wedge body coordinating with a third horizontal bar according to the embodiment of the disclosure.

As illustrated in FIG. 10 and FIG. 11, an auxiliary impeller 56 is disposed inside the auxiliary impeller chamber 44, and an axis of the auxiliary impeller 56 is perpendicular to an axis of the main impeller 55. An impeller shaft 54 of the auxiliary impeller 56 extends vertically downward through a bottom plate 57 of the box body 12. A power gear 83 is disposed on an end of the impeller shaft 54 and meshed with an intermediate gear 84. The intermediate gear 84 is meshed with a reduction gear 85. The intermediate gear 84 is disposed on the bottom plate 57 through a first rotating shaft 91. The reduction gear 85 is disposed on the bottom plate 57 through a second rotating shaft 92. A high rotational speed generated in the auxiliary impeller chamber 44 is reduced by deceleration of two sets of gears (i.e., the intermediate gear 84 and the reduction gear 85) and outputted by slow rotation of the reduction gear 85.

A suspension rod 86 is fixedly disposed on a bottom of the reduction gear 85. A wedge body 38 is threadedly connected to a side of the suspension rod 86 facing away from a center of the reduction gear 85 through bolts. A third horizontal bar 37 is disposed on a side of the toggle guide rod 34 facing toward the center of the reduction gear 85. The third horizontal bar 37 is disposed above a bottom plane of the wedge body 38. A slidable sleeve is disposed on a free end of the third horizontal bar 37, which facilitates the third horizontal bar 37 to rise to a high position of an inclined plane of the wedge body 38 through sliding contact.

In the embodiment, the wedge body 38 is connected to the bottom of the reduction gear 85 through the suspension rod 86 and is fixedly connected to a lower part of the suspension rod 86. The wedge body 38 has a symmetrical double inclined plane structure, and the third horizontal bar 37 is always located above the bottom plane of the wedge body 38.

When the third horizontal bar 37 is located between an upper plane and the bottom plane of the wedge body 38, and the wedge body 38 moves circularly with the reduction gear 85, the third horizontal bar 37 moves from bottom to top with the inclined plane of the wedge body 38 until reaching a height of the upper plane of the wedge body 38.

In the embodiment, a linear distance between the upper stationary position and the lower stationary position of the free end of the guide handle 79 is twice the distance between the first traction plate 75 and the second traction plate 76. The linear distance between the upper stationary position and the lower stationary position of the free end of the guide handle 79 is twice the distance between the first horizontal bar 35 and the second horizontal bar 36.

The wedge body 38 and the third horizontal bar 37 coordinate to achieve the closing and resetting functions of the clean water pipe 20. When the clean water pipe 20 of the box body 12 is in an opening state and the box body 12 is above a lower limit water level, the second horizontal bar 36 shifts upward with the box body 12, and the top of the second horizontal bar 36 is close to the bottom of the limiting rod 32.

The wedge body 38 moves circularly with the reduction gear 85. The third horizontal bar 37 moves from bottom to top with the inclined plane of the wedge body 38. The wedge body 38 exerts an upward force on the third horizontal bar 37. The third horizontal bar 37 drives the toggle guide rod 34 to move upward. The second horizontal bar 36 at the lower part of the toggle guide rod 34 moves upward. The third horizontal bar 37 is supported by the inclined plane of the wedge body 38 and continues to move upward. When the top of the second horizontal bar 36 is abutted against and stopped by the bottom of the limiting rod 32, a reaction force from the third horizontal bar 37 drives the box body 12 to move downward. At this point, the free end of the guide handle 79 below the guide handle base 80 is abutted against the second traction plate 76. Due to a reverse action from the second traction plate 76, the free end of the guide handle 79 moves upward. Under the reaction force of the spring 78, the first plug 70 on the plug guide rod 69 seals the clean water elbow 72. At this time, due to a circular motion of the wedge body 38, the third horizontal bar 37 moves away from a top or inclined plane of the wedge body 38, and the box body 12 moves upward. The free end of the guide handle 79 located above the guide handle base 80 is abutted against the first traction plate 75. Under the reaction force, the free end of the guide handle 79 moves toward a lower part of the guide handle base 80, driving the second plug 71 on the plug guide rod 69 to move downward and seal the sewage elbow 73, thereby keeping the clean water elbow 72 unobstructed.

The wedge body 38 and the third horizontal bar 37 coordinate to achieve the closing and resetting functions of the clean water pipe 20. When the clean water pipe 20 of the box body 12 is in the opening state and the box body 12 is below the lower limit water level, the wedge body 38 moves circularly with the reduction gear 85. The third horizontal bar 37 moves from bottom to top with the inclined plane of the wedge body 38. The wedge body 38 exerts the upward force on the third horizontal bar 37. The third horizontal bar 37 drives the toggle guide rod 34 to move upward. The second traction plate 76 on the toggle guide rod 34 presses the free end of the guide handle 79 upward, causing the free end of the guide handle 79 to move upward. The first plug 70 on the plug guide rod 69 is driven by the spring 78 to seal the clean water elbow 72.

As illustrated in FIG. 1, when the motor 13 works, the water flows into the box body 12 through the conveying pipe inlet 31, the spiral conveying pipe 17 and the box body water inlet 39 in turn. The filter mesh is disposed on the box body water inlet 39, so that filtered impurities are collected in the spiral conveying pipe 17.

Figure 12:
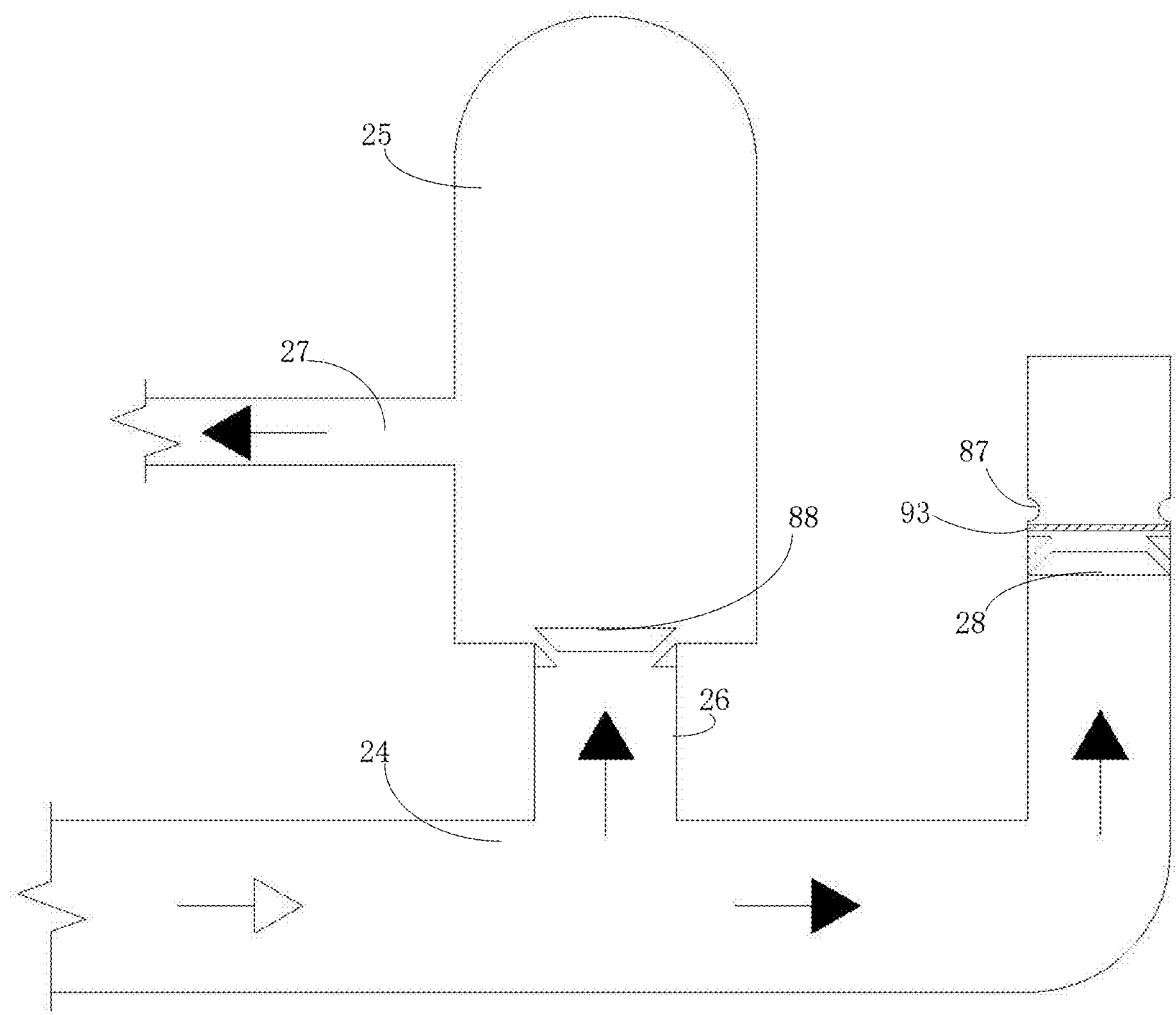
FIG. 12 illustrates a schematic structural view of a tank coordinating with a pressure regulating pipe according to an embodiment of the disclosure.

As illustrated in FIG. 1 and FIG. 12, an end of the spiral conveying pipe 17 facing away from the box body 12 is connected to an end of a corrugated pipe 18, and another end of the corrugated pipe 18 is connected to an end of a drainage pipe 22. The drainage pipe 22 is disposed outside the rainwater regulation and storage pool 11. Another end of the drainage pipe 22 facing away from the rainwater regulation and storage pool 11 is lower than a height of the spiral conveying pipe 17 (a drop height is greater than 1 meter) and connected to a pressure regulating pipe 24. A tank 25 is disposed on the pressure regulating pipe 24. The pressure regulating pipe 24 is communicated to a tank water inlet 26. A one-way valve 88 is disposed at the tank water inlet 26. A tank water outlet 27 on the tank 25 is communicated to a return pipe 23. An end of the return pipe 23 facing away from the tank 25 extends onto a filter screen 19 inside the rainwater regulation and storage pool 11. A drain valve 28 is disposed at an end of the pressure regulating pipe 24 facing away from the drainage pipe 22.

A diameter of the return pipe 23 is smaller than that of the drainage pipe 22. A detachable filter screen 93 is disposed on the pressure regulating pipe 24. The detachable filter screen 93 is disposed at a front end of the drain valve 28 to realize timely cleaning and replacement.

Pipes and components outside the rainwater regulation and storage pool 11 direct the water containing the impurities back into the filter screen 19 for filtration.

A principle of the intelligent rainwater regulation and storage system based on mid-layer water intake is as follows.

Firstly, the box body 12 is installed. The buoyancy acting on the box body 12 can be changed by adjusting the volume of floating block 14, to thereby adjust the depth of the box body 12 from the water surface of the rainwater regulation and storage pool 11. By coordination between the sliding block 29 and the sliding slot 30, the box body 12 can move up and down along the vertical rod 15 with changes of the water level.

To determine the position of the limiting rod 32 on the vertical rod 15, the first horizontal bar 35 is firstly fixed to the toggle guide rod 34. The box body 12 is slid up and down to make the box body water inlet 39 below the lower limit depth of water intake. The second plug 71 is sealed with the sewage elbow 73. The free end of the guide handle 79 is located below the guide handle base 80. The top of the second traction plate 76 is abutted against a bottom of the free end of the guide handle 79. Then the limiting rod 32 is moved until the top of the limiting rod 32 is abutted against the bottom of the first horizontal bar 35. At this time, the height position of the limiting rod 32 on the vertical rod 15 is the lower limit position. The limiting rod 32 is fixed on the vertical rod 15.

Secondly, the motor 13 is started to drive the main impeller 55 to rotate. The water flows into the regulating chamber 46 through the conveying pipe inlet, the box body water inlet 39 and the second diversion port 60 in turn. The driving shaft 61 on the main impeller 55 extends into the gear chamber 45. Output of the driving shaft 61 is transmitted to the spiral shaft 40 after being decelerated by the gear assembly. The spiral shaft 40 drives the spiral blade 41 to rotate. The spiral blade 41 rotates to transport the impurities collected in the spiral conveying pipe 17 to the pressure regulating pipe 24 component outside the rainwater regulation and storage pool 11, and then flows back the water for filtration and purification.

Thirdly, the drain valve 28 is in an opening state, and the water is discharged outward through an overflow port 87. When water flow from the drainage pipe 22 impacts the drain valve 28, the drain valve 28 is forced to close a valve disc under a pressure generated by the impact of the water flow. The pressure generated by the impact of the water flow from top to bottom opens the one-way valve 88 at the tank water inlet 26, and the water flow enters into the tank 25. When a pressure inside the pressure regulating pipe 24 is released through the one-way valve 88, the drain valve 28 falls due to a counterweight and returns to the opening state. The drain valve 28 discharges water to the outside. When the water flow from the drainage pipe 22 impacts the drain valve 28 again, the above steps are repeated to make the tank 25 accumulate water. When a water level in the tank 25 is higher than the tank water outlet 27 and a pressure reserve is completed after multiple impacts, the water inside the tank 25 will be exported through the tank outlet 27 and extend upward onto the filter screen 19 inside the rainwater regulation and storage pool 11, thereby achieving filtration and purification of water quality. Simply closing the overflow port 87 can stop filtering when necessary.

Fourthly, under action of the guide handle 79 and the spring 78, under normal conditions, the plug guide rod 69 is biased toward an upper or lower end thereof, and the first plug 70 at the upper end of the plug guide rod 69 is sealed with the clean water elbow 72, or the second plug 71 at the lower end of the plug guide rod 69 is sealed with the sewage elbow 73.

When the clean water elbow 72 is in the opening state, the free end of the guide handle 79 is located below the guide handle base 80, the second plug 71 is sealed with the sewage elbow 73, the first plug 70 is separated from the clean water elbow 72, and the water flows out through the clean water elbow 72. When the water level drops, the box body 12 falls to the preset lower limit water level with dropping of the water level. At this time, the toggle assembly is triggered, the top of the second traction plate 76 is abutted against the bottom of the guide handle 79, and the top of the limit rod 32 is abutted against the bottom of the first horizontal bar 35. As the water level continues to drop, the box body 12 moves downward along the water level, causing the guide handle 79 to be pushed in the reverse direction, and the free end of the guide handle 79 rotates upward around the guide handle rotating shaft 77. When the free end of the guide handle 79 rotates to the position perpendicular to the plug guide rod 69, due to the inertia of the guide handle 79 and the restoring force of the spring 78, the free end of the guide handle 79 is quickly pulled by the spring 78 to the position above the guide handle base 80. Under the reaction force of the spring 78, the plug guide rod 69 drives the first plug 70 to seal the clean water elbow 72 and the second plug 71 to separate from the sewage elbow 73, thereby opening the sewage elbow 73. In this way, the water flows out through the sewage pipe 21.

When the water level rises, the box body 12 moves upward along the water level. At this time, the bottom of the first traction plate 75 is abutted against the top of the free end of the guide handle 79, and the top of the second horizontal bar 36 is abutted against the bottom of the limiting rod 32. When the box body 12 continues to move upward, the free end of the guide handle 79 rotates downward around the guide handle rotating shaft 77. The guide handle 79 is quickly pulled by the spring 78 to the position below the guide handle base 80. Under the reaction force of the spring 78, the plug guide rod 69 is pulled to move downward. The plug guide rod 69 drives the second plug 71 to seal the sewage elbow 73 and the first plug 70 to separate from the clean water elbow 72, thereby opening the clean water elbow 72, so that the rainwater meeting the standard can be transported to the usage area through the clean water elbow 72.

Fifthly, when the box body water inlet 39 is below the lower limit water level, and the clean water pipe 20 of the box body 12 is in the opening state, the wedge body 38 and the third horizontal bar 37 coordinate to achieve the closing and resetting functions of the cleaning water port 20. The wedge body 38 moves circularly with the reduction gear 85. The third horizontal bar 37 moves from bottom to top with the inclined plane of the wedge body 38. The wedge body 38 exerts the upward force on the third horizontal bar 37. The third horizontal bar 37 drives the toggle guide rod 34 to move upward. The second traction plate 76 on the toggle guide rod 34 presses the free end of the guide handle 79 upward, causing the free end of the guide handle 79 to move upward, and the first plug 70 on the plug guide rod 69 is driven by the spring 78 to seal the clean water elbow 72.

When the box body water inlet 39 is above the lower limit water level, and the clean water pipe 20 of the box body 12 is in the opening state, the second horizontal bar 36 shafts upward with the box body 12. The top of the second horizontal bar 36 is close to the bottom of the limiting rod 32. The wedge body 38 and the third horizontal bar 37 coordinate to achieve the closing and resetting functions of the cleaning water port 20.

The wedge body 38 moves circularly with the reduction gear 85. The third horizontal bar 37 moves from bottom to top with the inclined plane of the wedge body 38. The wedge body 38 exerts the upward force on the third horizontal bar 37. The third horizontal bar 37 drives the toggle guide rod 34 to move upward. The second horizontal bar 36 at the lower part of the toggle guide rod 34 moves upward. The third horizontal bar 37 is supported by the inclined plane of the wedge body 38 and continues to move upward. When the top of the second horizontal bar 36 is abutted against and stopped by the bottom of the limiting rod 32, the reaction force from the third horizontal bar 37 drives the box body 12 to move downward. The free end of the guide handle 79 below the guide handle base 80 is abutted against the second traction plate 76. Due to the reverse action from the second traction plate 76, the free end of the guide handle 79 moves upward. Under the reaction force of the spring 78, the first plug 70 on the plug guide rod 69 seals the clean water elbow 72. At this time, due to the circular motion of the wedge body 38, the third horizontal bar 37 moves away from the top or inclined plane of the wedge body 38, and the box body 12 moves upward. The free end of the guide handle 79 above the guide handle base 80 is abutted against the bottom of the first traction plate 75. Under the reaction force, the free end of the guide handle 79 moves toward the lower part of the guide handle base 80, driving the second plug 71 on the plug guide rod 69 to move downward and seal the sewage elbow 73, thereby opening the clean water elbow 72 to transport the water to the usage area.

Technical concepts of the disclosure are illustrated by aforementioned embodiments of the disclosure, but the disclosure is not limited to the aforementioned embodiments; that is, it does not mean that the disclosure must rely on the aforementioned embodiments to be implemented. Those skilled in the art should understand that relevant improvements made to the disclosure fall within scopes of protection and disclosure of the disclosure.

What is claimed is:

1. An intelligent rainwater regulation and storage system based on mid-layer water intake, comprising a vertical rod (15) and a limiting sleeve (33) fixedly disposed on a bottom of a rainwater regulation and storage pool (11);

wherein a sliding sleeve (16) is disposed on an upper part of the vertical rod (15), and a limiting rod (32) is disposed on a lower part of the vertical rod (15); a box body (12) is slidably connected to a side of the sliding sleeve (16); a floating block (14) is disposed on a top of the box body (12), and the box body (12) is in a hollow structure; a transverse partition plate (49) is disposed inside the box body (12), and configured to divide the box body (12) into two compartments; a first longitudinal partition plate (52) is disposed inside one of the two compartments, and the one of the two compartments is divided into a main impeller chamber (43) and a regulating chamber (46) through the first longitudinal partition plate (52); a second longitudinal partition plate (53) is disposed inside the other of the two compartments, and the other of the two compartments is divided into an auxiliary impeller chamber (44) and a gear chamber (45) through the second longitudinal partition plate (53); the first longitudinal partition plate (52) and the second longitudinal partition plate (53) are perpendicular to the transverse partition plate (49); a motor (13) is disposed on an outer side of a side plate of the main impeller chamber (43) facing away from the transverse partition plate (49); a driving shaft (61) of the motor (13) extends into the main impeller chamber (43), and a main impeller (55) is disposed on the driving shaft (61); the regulating chamber (46) and the auxiliary impeller chamber (44) are disposed on two sides of a centerline of the main impeller (55), respectively; a first diversion port (59) is defined on the transverse partition plate (49) between the main impeller chamber (43) and the auxiliary impeller chamber (44); a second diversion port (60) is defined on the first longitudinal partition plate (52); a box body water inlet (39) is defined on a side plate of the auxiliary impeller chamber (44) facing away from the transverse partition plate (49); the driving shaft (61) penetrates through the transverse partition plate (49) and extends into the gear chamber (45); a driving gear (63) is disposed on a part of the driving shaft (61) inside the gear chamber (45); an output end of the driving shaft (61), after meshed with a gear assembly, is connected to a spiral shaft (40); the spiral shaft (40) extends outside the box body (12); a spiral blade (41) is disposed on the spiral shaft (40); a spiral conveying pipe (17) is sleeved outside the spiral blade (41); the box body water inlet (39) is disposed inside the spiral conveying pipe (17); a conveying pipe inlet (31) is defined on a side of the spiral conveying pipe (17) facing toward the box body (12); a clean water pipe (20) is thoroughly disposed on an upper part of a side plate of the regulating chamber (46) and extends into the regulating chamber (46), a sewage pipe (21) is thoroughly disposed on a lower part of the side plate of the regulating chamber (46) and extends into the regulating chamber (46); a first vertical opening (89) of the clean water pipe (20) inside the regulating chamber (46) and a second vertical opening (90) of the sewage pipe (21) inside the regulating chamber (46) are disposed opposite to each other; a plug guide rod (69) is disposed between the first vertical opening (89) and the second vertical opening (90); a first plug (70) and a second plug (71) are disposed on two ends of the plug guide rod (69), respectively; the plug guide rod (69) slidably penetrates through a first limiting block (67) and a second limiting block (68); an end of the first limiting block (67) and an end of the second limiting block (68) are fixedly disposed on another side plate of the regulating chamber (46); a toggle assembly is disposed on a side of the plug guide rod (69); the toggle assembly comprises a guide handle base (80); the guide handle base (80) is disposed between the plug guide rod (69) and the transverse partition plate (49) and fixedly disposed on the first longitudinal partition plate (52); a guide handle (79) is disposed on the guide handle base (80) through a guide handle rotating shaft (77); an end of the guide handle (79) facing away from the guide handle rotating shaft (77) is connected to an end of a spring (78) through a second spring pin (82); another end of the spring (78) is connected to a middle part of the plug guide rod (69) through a first spring pin (81); a guide sleeve (74) is disposed on a side of the guide handle base (80) facing away from the plug guide rod (69), a toggle guide rod (34) is slidably penetrates the guide sleeve (74); a bottom of the toggle guide rod (34) is slidably disposed in the limiting sleeve (33); a first horizontal bar (35) and a second horizontal bar (36) are disposed on the toggle guide rod (34) facing toward the limiting rod (32), the first horizontal bar (35) is disposed above the limiting rod (32), and the second horizontal bar (36) is disposed below the limiting rod (32); and a third horizontal bar (75) and a fourth horizontal bar (76) are disposed on the toggle guide rod (34) facing toward the guide handle (79), the third horizontal bar (75) is disposed above the guide handle (79), and the fourth horizontal bar (76) is disposed below the guide handle (79).

2. The intelligent rainwater regulation and storage system based on mid-layer water intake as claimed in claim 1, wherein the gear assembly comprises the driving gear (63), a driven gear (64), a first transmission gear (65), and a second transmission gear (66); the driving gear (63) is meshed with the driven gear (64), and the driven gear (64) is disposed on an end of a driven shaft (62); the driven shaft (62) is disposed on opposite side plates of the gear chamber (45) through bearings; the first transmission gear (65) is disposed on another end of the driven shaft (62) and meshed with the second transmission gear (66); and the second transmission gear (66) is connected to the spiral shaft (40).

3. The intelligent rainwater regulation and storage system based on mid-layer water intake as claimed in claim 1, wherein an auxiliary impeller (56) is disposed inside the auxiliary impeller chamber (44), and an axis of the auxiliary impeller (56) is perpendicular to an axis of the main impeller (55); an impeller shaft (54) of the auxiliary impeller (56) extends vertically downward through a bottom plate (57) of the box body (12); a power gear (83) is disposed on an end of the impeller shaft (54) and meshed with an intermediate gear (84); the intermediate gear (84) is meshed with a reduction gear (85); the intermediate gear (84) is disposed on an outer side of the bottom plate (57) through a first rotating shaft (91); and the reduction gear (85) is disposed on the outer side of the bottom plate (57) through a second rotating shaft (92).

4. The intelligent rainwater regulation and storage system based on mid-layer water intake as claimed in claim 3, wherein a suspension rod (86) is fixedly disposed on a bottom of the reduction gear (85); a wedge body (38) is threadedly connected to a side of the suspension rod (86) facing away from a center of the reduction gear (85); a third horizontal bar (37) is disposed on a side of the toggle guide rod (34) facing toward the center of the reduction gear (85); and the third horizontal bar (37) is disposed above a bottom plane of the wedge body (38).

5. The intelligent rainwater regulation and storage system based on mid-layer water intake as claimed in claim 1, wherein the sliding sleeve (16) is connected to the box body (12) through a sliding block (29); a side of the sliding sleeve

(16) is thoroughly defined with a sliding slot (30) along a vertical direction; the sliding block (29) is disposed in the sliding slot (30); and an end of the sliding block (29) facing away from the sliding slot (30) is welded to the box body (12).

6. The intelligent rainwater regulation and storage system based on mid-layer water intake as claimed in claim 1, wherein an end of the spiral conveying pipe (17) facing away from the box body (12) is connected to an end of a corrugated pipe (18), and another end of the corrugated pipe (18) is connected to an end of a drainage pipe (22); the drainage pipe (22) is disposed outside the rainwater regulation and storage pool (11); another end of the drainage pipe (22) facing away from the rainwater regulation and storage pool (11) is lower than a height of the spiral conveying pipe (17) and connected to a pressure regulating pipe (24); a tank (25) is disposed on the pressure regulating pipe (24), and the pressure regulating pipe (24) is communicated to a tank water inlet (26); a one-way valve (88) is disposed on the tank water inlet (26); a tank water outlet (27) on the tank (25) is communicated to a return pipe (23); a diameter of the return pipe (23) is smaller than that of the drainage pipe (22); an end of the return pipe (23) facing away from the tank (25) extends onto a filter screen (19) inside the rainwater regulation and storage pool (11); and a drain valve (28) is disposed at an end of the pressure regulating pipe (24) facing away from the drainage pipe (22).

7. The intelligent rainwater regulation and storage system based on mid-layer water intake as claimed in claim 6, wherein a detachable filter screen (93) is disposed on the pressure regulating pipe (24), and the detachable filter screen is disposed at a front end of the drain valve (28).

8. The intelligent rainwater regulation and storage system based on mid-layer water intake as claimed in claim 6, wherein the drain valve (28) is a counterweight drain valve.

9. The intelligent rainwater regulation and storage system based on mid-layer water intake as claimed in claim 4, wherein a slidable sleeve is disposed on a free end of the third horizontal bar (37).

\* \* \* \* \*